United States Patent
Frick et al.

(10) Patent No.: US 7,362,700 B2
(45) Date of Patent: Apr. 22, 2008

(54) METHODS AND SYSTEMS FOR HITLESS RESTART OF LAYER 3 PACKET FORWARDING

(75) Inventors: John Kevin Frick, Raleigh, NC (US); Donald B. Grosser, Apex, NC (US); Michael D. Mroz, Fuquay-Varina, NC (US)

(73) Assignee: Extreme Networks, Inc., Santa Clara, CA (US)

( * ) Notice: Subject to any disclaimer, the term of this patent is extended or adjusted under 35 U.S.C. 154(b) by 984 days.

(21) Appl. No.: 10/184,483

(22) Filed: Jun. 27, 2002

(65) Prior Publication Data

US 2004/0001485 A1 Jan. 1, 2004

(51) Int. Cl.
*G06F 11/00* (2006.01)
(52) U.S. Cl. .................. 370/219; 370/352; 370/401
(58) Field of Classification Search ........ 370/216–220, 370/352, 353, 395.31, 395.52–395.54, 401
See application file for complete search history.

(56) References Cited

U.S. PATENT DOCUMENTS

| | | | |
|---|---|---|---|
| 4,694,452 A | | 9/1987 | Beckinger et al. |
| 5,835,696 A | * | 11/1998 | Hess ............................ 714/10 |
| 5,963,540 A | * | 10/1999 | Bhaskaran ................. 370/218 |
| 6,035,415 A | * | 3/2000 | Fleming ...................... 714/11 |
| 6,148,410 A | * | 11/2000 | Baskey et al. ................. 714/4 |
| 6,442,250 B1 | | 8/2002 | Troen-Krasnow et al. |
| 6,490,246 B2 | * | 12/2002 | Fukushima et al. ......... 370/220 |
| 6,650,660 B1 | | 11/2003 | Koehler et al. |
| 6,674,713 B1 | | 1/2004 | Berg et al. |
| 6,732,184 B1 | * | 5/2004 | Merchant et al. ........... 709/238 |

(Continued)

FOREIGN PATENT DOCUMENTS

EP 1294137 A1 * 3/2003

(Continued)

OTHER PUBLICATIONS

Kim, Youjin et al., "Scalable Redundant IPC Network," IEEE Region 10 Conference, TENCON 2004. vol. C, Nov. 2004. pp. 176-179.*

(Continued)

*Primary Examiner*—Chi Pham
*Assistant Examiner*—Donald L Mills
(74) *Attorney, Agent, or Firm*—Jenkins, Wilson, Taylor & Hunt, P.A.

(57) ABSTRACT

A method for hitless restart of layer 3 packet forwarding includes replicating some but not all state information from a master management service module to a slave management service module. The master management service module builds a layer 3 routing table by participating in layer 3 routing protocols. The layer 3 routing table is stored in memory. The master management service module builds a first layer 3 forwarding table and stores the forwarding information in hardware. A slave management service module receives a copy of the first layer 3 forwarding table from the master management service module. When the master management service module fails, the slave management service module initiates construction of a routing table by participating in layer 3 routing protocols. Packet forwarding is not interrupted because forwarding using hardware entries continues. The slave management service module links entries in the newly constructed routing table to those stored in the forwarding table.

37 Claims, 4 Drawing Sheets

U.S. PATENT DOCUMENTS

| | | |
|---|---|---|
| 6,738,826 B1 | 5/2004 | Moberg et al. |
| 6,751,191 B1 * | 6/2004 | Davar et al. ................. 370/217 |
| 6,885,635 B1 * | 4/2005 | Haq et al. ................... 370/219 |
| 6,928,576 B2 * | 8/2005 | Sekiguchi ....................... 714/4 |
| 6,941,487 B1 * | 9/2005 | Balakrishnan et al. ......... 714/4 |
| 7,274,711 B2 | 9/2007 | Kajizaki et al. |
| 7,274,926 B1 | 9/2007 | Laumen et al. |
| 2003/0154154 A1 | 8/2003 | Sayal et al. |
| 2004/0001485 A1 | 1/2004 | Frick et al. |
| 2004/0034703 A1 | 2/2004 | Phadke |
| 2004/0047286 A1 | 3/2004 | Larsen et al. |

FOREIGN PATENT DOCUMENTS

| | | |
|---|---|---|
| GB | 2409601 A * | 6/2005 |
| WO | WO 2098059 A1 * | 12/2002 |

OTHER PUBLICATIONS

Office Action for U.S. Appl. No. 10/743,887 (Jul. 12, 2007).
Office Action for U.S. Appl. No. 10/743,887 (Jan. 10, 2008).

* cited by examiner

METHODS AND SYSTEMS FOR HITLESS RESTART OF LAYER 3 PACKET FORWARDING

TECHNICAL FIELD

The present invention relates to methods and systems for layer 3 packet forwarding. More particularly, the present invention relates to methods and systems for hitless restart of layer 3 packet forwarding.

BACKGROUND ART

Open systems interConnect (OSI) layer 3 forwarding devices such as internet protocol (IP) routers maintain a routing database and forwarding tables to control the forwarding of layer 3 packets. The routing database may be generated by participating in layer 3 routing protocols to obtain next hop information for received packets. The forwarding tables may be generated based on lookups in the routing table.

Participating in layer 3 routing protocols, such as Open Shortest Path First (OSPF), Border Gateway Protocol (BGP), Intermediate System to Intermediate System (IS-IS), Protocol Independent Multicast (PIM) Dense Mode (PIM-DM), PIM Sparse Mode (PIM-SM), Distance Vector Multicast Routing Protocol (DVMRP), and Core Based Trees (CBT) can consume a high percentage processor cycles of a layer 3 forwarding device, such as an IP router. Accordingly, IP routers typically have a management module that participates in these protocols and distributes routes learned from participating in the layer 3 routing protocols to input/output modules that actually forward packets. For reliability purposes, some layer 3 forwarding devices may include a backup management module to take over participation in layer 3 routing protocols in the event of failure of the main management module. The switching of control from the main management module to the backup management module is referred to as failover.

One goal of the failover mechanisms is to be hitless with regard to packet forwarding. As used herein, the term "hitless failover" refers to continuing packet forwarding for existing connections when the main management module on a layer 3 forwarding device fails. In some conventional layer 3 forwarding devices, failover mechanisms are not hitless. That is, when the main management module fails, the backup management module must be booted from scratch, and or it must learn routing table entries by participating in the layer 3 routing protocols. Packets on existing connections will be dropped or routed around the failed the device until the new main management module participates in the IP routing protocols to reestablish itself with other nodes in the network. Higher protocol layers running on end nodes are required to retransmit dropped packets. This type of restart can be referred to as "cold restart." In light of the problems associated with cold restart, hitless restart mechanisms have been proposed. One hitless restart mechanism is proposed in Moy, J., *Hitless OSPF Restart*, draft-ietf-ospf-hitless-restart-02.text, February 2002 (hereinafter, "Moy"). According to Moy, an OSPF router attempting a hitless restart originates grace link state advertisements (LSAs) announcing the intention to perform a hitless restart and asking for a grace period. During the grace period, its neighbors continue to announce the restarting router in their LSAs as if it were operating normally, and packets are routed through the restarting router using its forwarding tables which are preserved during the restart. One problem with the solution proposed in Moy is that it requires an extension to the OSPF protocol in that routers adjacent to the restarting router must recognize the grace LSAs and give the restarting router a grace period to restart its OSPF protocol function.

Another hitless restart mechanism that has been proposed is Sangli et al., *Graceful Restart Mechanism for BGP*, draft-ietf-idr-restart-05.text (June 2002) (hereinafter, "Sangli"). Sangli proposes a graceful restart mechanism for BGP. BGP or border gateway protocol is a routing protocol for routers that are not in the same administrative domain. The graceful restart mechanism proposed in Sangli requires the router requesting to restart its BGP protocol to send a message to its BGP pairs indicating its ability to preserve its forwarding state during BGP restart. Like the solution proposed in Moy, the peer routers wait for a predetermined time period before removing the BGP router from their forwarding tables. Also like the solution proposed in Moy, the BGP restart mechanism proposed in Sangli requires that neighboring routers participate in extensions to the BGP protocol.

Another problem with the restart mechanisms proposed in both Sangli and Moy is that they only relate to specific routing protocols. A given router may run multiple protocols, requiring a separate restart mechanism for each protocol. A possible solution to this hitless restart problem is to run all of the routing protocols on the backup management module so that restart can occur seamlessly. However, running all of the routing protocols on the backup management module is processor-intensive and requires synchronization between the databases and protocol state machines of the main and backup management modules. Moreover, neither Moy nor Sangli discusses or presents a solution to the problem of linking hardware and software forwarding table entries after a re-start.

Accordingly, in light of these problems associated with conventional restart mechanisms, there exists a long felt need for improved methods and systems for hitless restart of layer 3 forwarding.

DISCLOSURE OF THE INVENTION

The present invention includes a method for hitless restart of layer 3 packet forwarding in response to failure of a management service module (MSM). In a layer 3 forwarding device, such as an IP router, one management service module functions as a master and another management service module functions as a slave. The master management service module builds a layer 3 routing table by participating in layer 3 routing protocols. This layer 3 routing table is stored in memory. A hardware layer 3 forwarding table is constructed by performing lookups in the layer 3 routing table and storing the results in hardware. This layer 3 forwarding table is replicated to hardware-specific forwarding tables which may be located on input/output modules and/or either or both management service modules. A software copy of the hardware forwarding table may also be stored on both the master and slave management service modules.

When the master management service module fails, the slave management service module allows the forwarding hardware to continue operation. The slave management service module also starts running layer 3 routing protocols to build another forwarding table. Entries in the forwarding table built using layer 3 routing protocols are linked with entries in the hardware forwarding table using the software copy received from the former master management service module. Any entries that are not linked within a predetermined time period are preferably deleted from both hardware and the software copy of the hardware layer 3 forwarding table.

Because the slave management service module maintains hardware and software copies of the hardware forwarding tables formerly managed by the master management service module, hitless restart can be performed for existing routes, i.e., those routes for which an entry existed in the hardware forwarding table. New routes may be learned in the normal manner by participating in IP routing protocols after restart. The slave management service module need not participate in layer 3 routing protocols prior to restart. As a result, the need for synchronization between the master and slave management service modules is reduced.

Accordingly, it is an object of the invention to provide improved methods and systems for hitless restart of layer 3 packet forwarding.

It is another object of the invention to provide improved methods and systems for hitless restart of layer 3 packet forwarding that reduce the amount of state information required to be replicated between master and slave management service modules.

Some of the objects of the invention having been stated hereinabove, other objects will become evident as the description proceeds when taken in connection with the accompanying drawings as best described hereinbelow.

BRIEF DESCRIPTION OF THE DRAWINGS

Preferred embodiments of the invention will now be explained with reference to the accompanying drawings of which.

DETAILED DESCRIPTION OF THE INVENTION

Methods and systems for hitless restart of layer 3 packet forwarding may be implemented in any suitable layer 3 forwarding device, such as an IP router.

Figure 1:
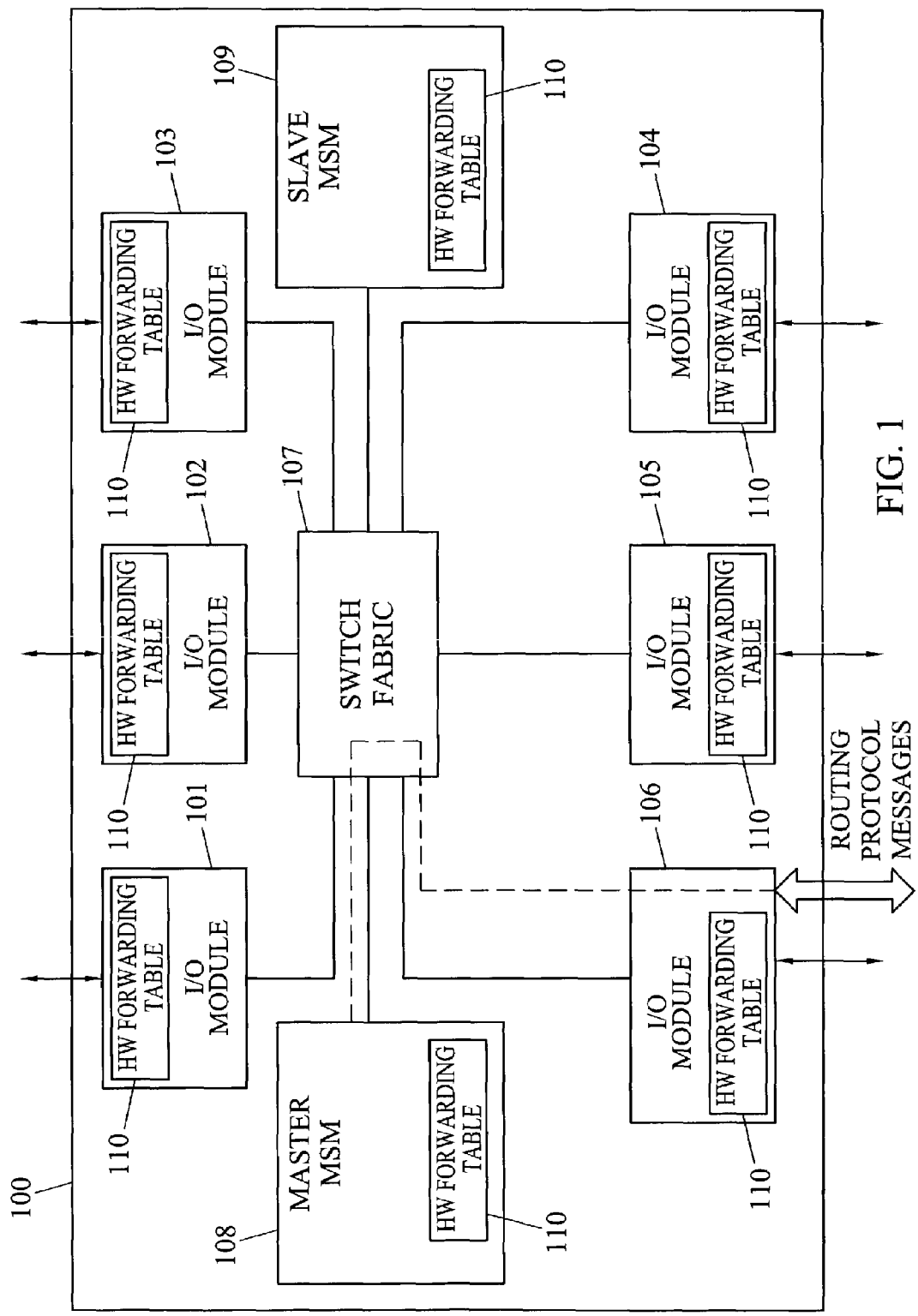
FIG. 1 is a block diagram of a layer 3 forwarding device including master and slave management service modules according to an embodiment of the present invention.

FIG. 1 illustrates exemplary components of a layer 3 forwarding device including hardware and software for implementing hitless restart according to an embodiment of the present invention. Referring to FIG. 1, layer 3 forwarding device 100 comprises an IP router for forwarding network level datagrams to their intended destinations. IP router 100 may be implemented on any suitable underlying layer 1 and 2 platform, such as an Ethernet switch. An exemplary Ethernet switch including an underlying hardware platform suitable for use with embodiments of the present invention is the BlackDiamond™ Ethernet switch available from Extreme Networks of Santa Clara, Calif.

In the illustrated example, layer 3 forwarding device 100 includes a plurality of input/output modules 101-106. Input/output modules 101-106 send and receive layer 3 packets over a network. Input/output modules may each be implemented as printed circuit boards plugged into slots in layer 3 forwarding device 100. A switch fabric 107 connects input/output modules to each other and to master and slave management service modules 108 and 109. Switch fabric 107 may be any suitable type of switching fabric. In one exemplary embodiment, switch fabric 107 includes a puraity of gigabit Ethernet connections, one half of which are managed by management service module 108, and the other half of which that are managed by slave management service module 109.

Figure 2:
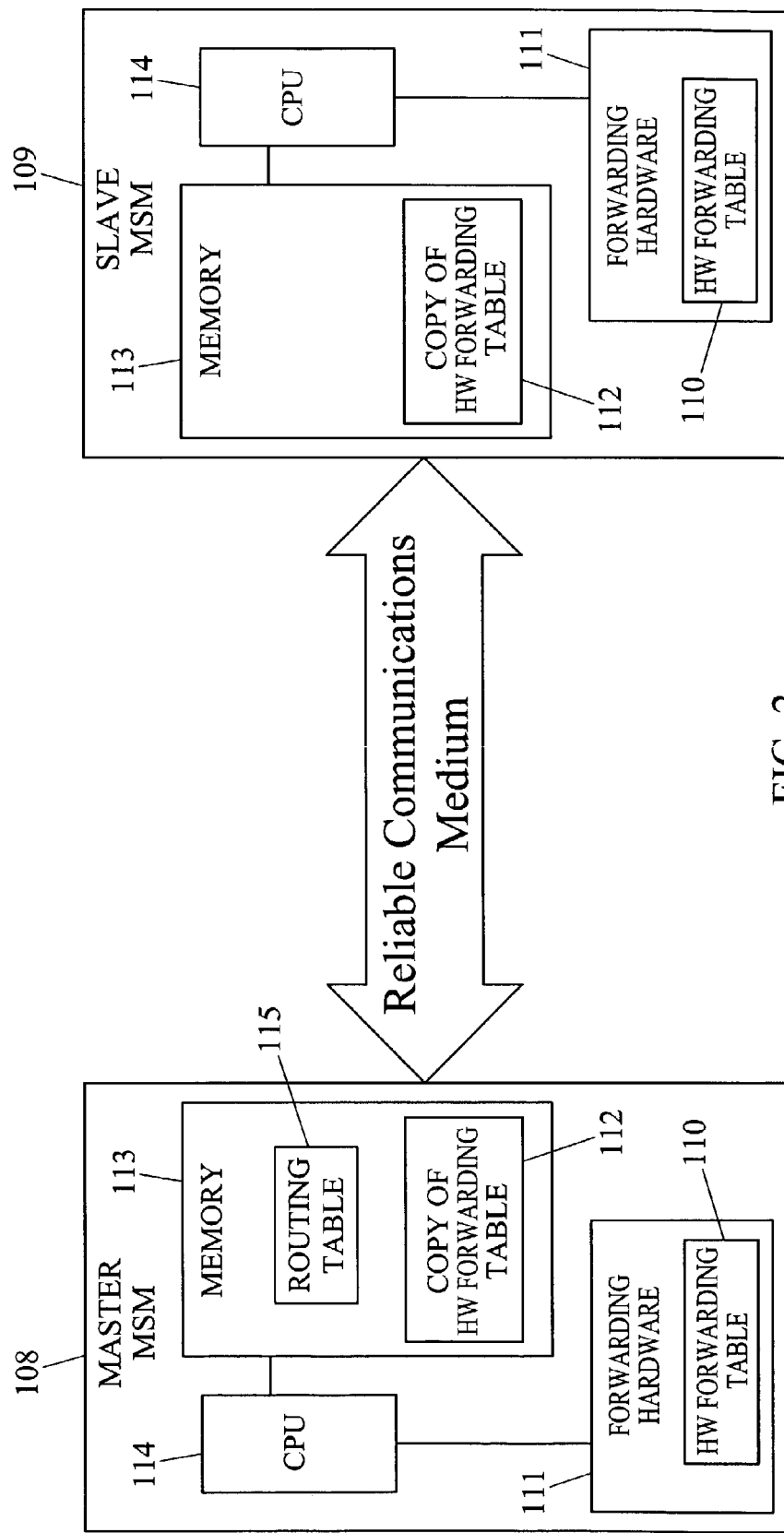
FIG. 2 is a block diagram of master and slave management service modules including exemplary hardware and software for performing hitless restart according to an embodiment of the present invention.

Master and slave management service modules 108 and 109 each include hardware and software for implementing hitless failover. FIG. 2 illustrates exemplary components of master and slave MSMs 108 and 109 associated with hitless failover. In the illustrated example, master and slave management service modules 108 and 109 each include a hardware forwarding table 110. Hardware forwarding table 110 may be stored in packet forwarding hardware 111. Packet forwarding hardware 111 may be any suitable hardware implementation designed for layer 3 packet forwarding. For example, layer 3 packet forwarding hardware 111 may include a set of customized ASICs designed to provide real time processing of transmitted and received data, to classify data for forwarding table lookups, perform these lookups to identify the output interface(s), perform any required data modification, and final transmission to the output interface(s).

Hardware forwarding table 110 stores destination addresses of received packets and corresponding forwarding information. This forwarding table is replicated to input/output modules 101-106 to enable forwarding of packets, as illustrated in FIG. 1. Master and slave management service modules 108 and 109 also maintain a software copy 112 of hardware forwarding table 110. By software copy, it is meant that forwarding table 111 is stored in memory 113 accessible by a CPU 114 of management service modules 108 and 109. The reason for maintaining a software copy of hardware forwarding table 110 is to reduce the processing impact of updating entries in hardware forwarding table 110. For example, updating a forwarding table entry typically includes reading the current forwarding table entry, comparing the entry with newly received routing information, and determining whether the forwarding table entry requires updating. This involves multiple reads and writes to hardware as well as intermediate calculations. Performing these operations using only the hardware forwarding table can adversely affect forwarding and management performance. Accordingly, in order to reduce the effects of updating forwarding table entries, software copies 112 may be used. Software copies 112 are used to determine whether entries in hardware are out of date. The entries in hardware are only accessed when necessary.

The present invention is not limited to storing software copies of hardware forwarding tables. In an alternate embodiment, software copies 112 may be omitted and entries may be accessed by accessing hardware forwarding tables 110 directly.

According to an important aspect of the invention, master management service module 108 includes a routing table 115 that is preferably not replicated to slave management service module 109. Routing table 115 is preferably constructed by participating in IP routing protocols. Exemplary IP routing protocols in which master MSM may participate includes any of the above referenced IP routing protocols, such as BGP, OSPF, IS-IS, etc. Slave MSM 109 preferably does not participate in IP routing protocols until a restart occurs.

Master and slave management service modules 108 and 109 may communicate with each other over suitable reliable communications mechanism.

In one example, the reliable communication mechanism may be shared memory.

That is, master MSM 108 may be capable of writing to memory of slave MSM 109, but not vice versa. The reason for implementing one-way shared memory is so that a bug in slave MSM 109 will not affect the operation of master MSM 108.

Figure 3:
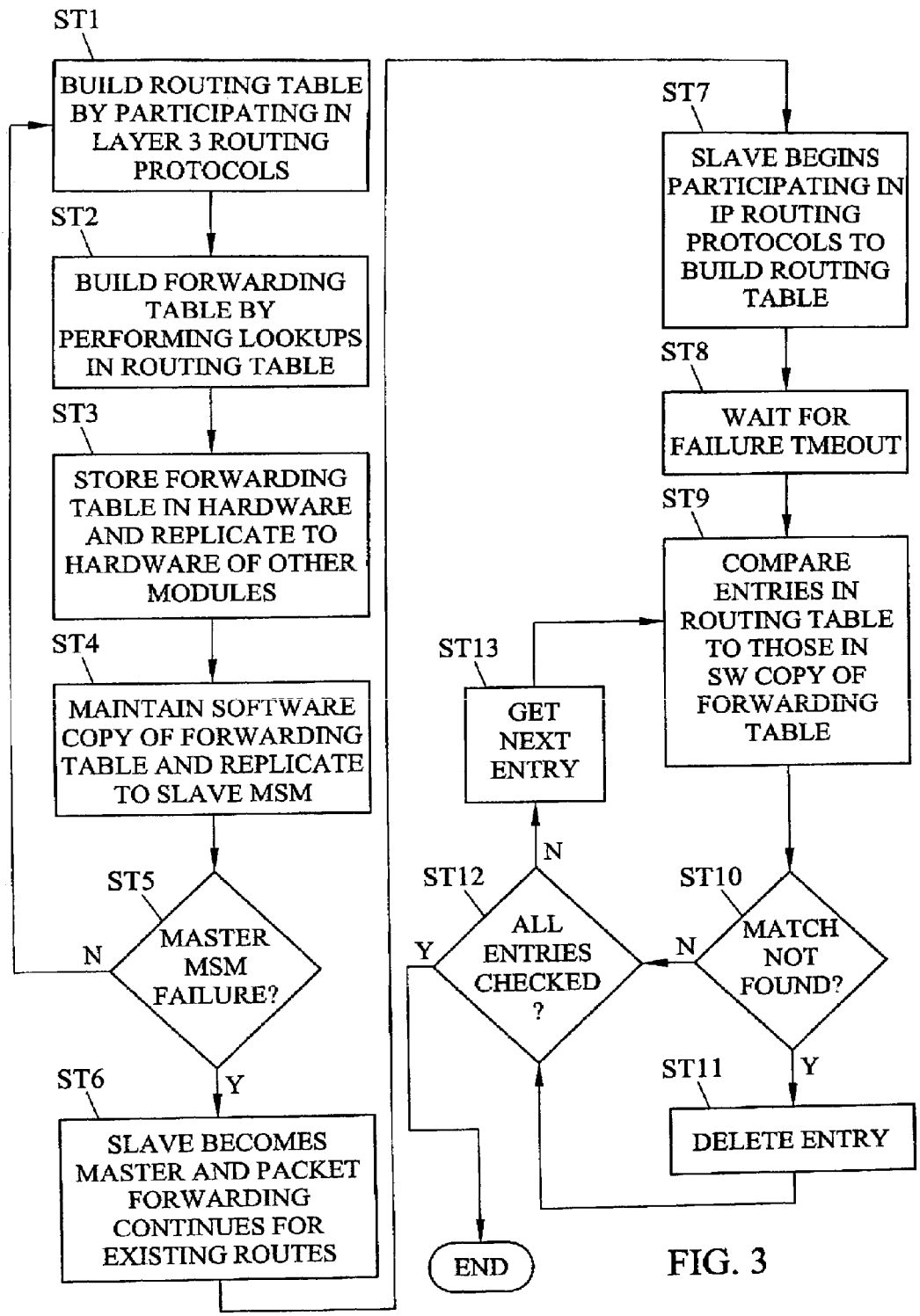
FIG. 3 is a flow chart illustrating exemplary steps of a method for hitless restart of layer 3 forwarding according to an embodiment of the present invention.

FIG. 3 is a flow chart illustrating exemplary steps that may be performed by master and slave MSMs 108 and 109 in performing hitless restart of layer 3 forwarding according to an embodiment of the present invention. Referring to FIG. 3, in step ST1, master management service module 108 builds routing table 115 by participating in layer 3 routing protocols. Any one or more of the above referenced layer 3 routing protocols may be used to perform this step. In step ST2, master management service module 108 builds forwarding table 110 by performing lookups in routing table 115. For example, when a packet is received by one of the input/output modules 101-106, each input/output module performs a lookup in its hardware forwarding table 110 to determine whether an entry exists corresponding to the received packet. If a forwarding table entry does not exist in hardware, the I/O module accesses routing table 115 on master MSM 108 to determine the forwarding information packet. Master MSM 108 then updates the hardware table based on the lookup in routing table 115, so that the next time a packet arrives, it will be routed using hardware rather than software.

In one embodiment of the invention, hardware forwarding table 110 contains individual IP addresses and corresponding forwarding information. Table 1 shown below illustrates an example of forwarding table information that may be included in hardware forwarding table 110.

TABLE 1

Hardware Forwarding Table Information

| Destination IP Address | Forwarding Information |
|---|---|
| 1.2.3.27 | MAC_ADDR/VLAN_ID/port_ID |
| 1.2.3.48 | MAC_ADDR/VLAN_ID/port_ID |

In Table 1, individual IP addresses extracted from received addresses may be stored along with corresponding forwarding information. The forwarding information is illustrated in text format as MAC_ADDR for media access control addresses, VLAN_ID for virtual local area network identifiers, and port_ID for I/O port identifiers. It is understood that in the actual implementation of the invention, binary values corresponding to actual MAC and VLAN addresses and output ports would be present in this table. Storing individual IP addresses extracted from received packets reduces the need to implement a longest prefix matching algorithm in hardware. However, the present invention is not limited to storing individual IP addresses in hardware forwarding table 110. In an alternate embodiment of the invention, a longest prefix matching algorithm may be implemented in hardware and the individual entries illustrated in Table 1 may be replaced by address prefixes and subnet masks.

Table 2 shown below illustrates an example of entries that may be included in a routing table, such as routing table 115 illustrated in FIG. 2.

TABLE 2

Software Routing Table

| Destination IP Address/Subnet Mask | Forwarding Information |
|---|---|
| 1.2.3.0/24 | MAC_ADDR/VLAN_ID/port_ID |
| 1.2.4.0/24 | MAC_ADDR/VLAN_ID/port_ID |

As illustrated in Table 2, each entry in routing table 115 may include an address prefix and a subnet mask. The subnet mask is applied to destination IP addresses in received packets and the result is compared with the prefix in the prefix portion of the table. The entry having the longest prefix is considered to be a match. The corresponding forwarding information is extracted from routing table 115 and used to route the packet to its intended destination. As discussed above, the entries in routing table 115 may be built by participating in IP routing protocols.

Returning to FIG. 3, in step ST4, master management service module 108 maintains a software copy of the forwarding table and replicates the software copy to slave management service module 109. As stated above, the reason for maintaining a software copy of the forwarding table is to facilitate updating of forwarding table entries without adversely affecting packet forwarding. When a new forwarding table entry is learned, software copy 112 of hardware forwarding table 110 is preferably updated before the hardware is updated to reduce the likelihood of unknown entries being present in hardware.

In step ST5, it is determined whether master MSM 108 has failed. Master MSM 108 may fail for any number of reasons, including hardware and software exceptions or management action to force activation of slave MSM 109, e.g., to replace master MSM 108 or upgrade software executing on master MSM 108. The failure may be detected by slave MSM 109 by any number of mechanisms, including the absence of heartbeat messages from master MSM 108 or a failure message indicating that a failure has occurred. if there is no master MSM failure, master MSM 108 continues operating as normal and controls the operation of layer 3 forwarding device 100.

If master MSM fails, in step ST6, slave MSM 109 becomes the master. According to an important aspect of the invention, packet forwarding continues for existing routes or existing routes or network traffic flows because hardware database 110 was replicated to slave MSM 110 and I/O modules 101-106. Thus, provided that the entries in these forwarding tables are still valid, packet forwarding will continue without error.

In step ST7, slave MSM 109 begins participation in IP routing protocols to build an IP routing table. Because slave MSM is not required to run these IP routing protocols in advance of failure, the problem of synchronization between master MSM 108 and slave MSM 109 is eliminated.

Once slave MSM 109 becomes the master, slave MSM 109 may immediately (i.e., with enhanced priority) begin sending layer 2 keepalive messages to its neighbors. This reduces the likelihood that the neighbors will declare a topology change and thus send messages around this switch rather than to it.

In step ST8, slave MSM waits for a timer to expire to begin linking entries in its newly-constructed routing table with entries in software copy 112 of hardware forwarding table 110. Once this timer expires, in step ST9, slave MSM 109 begins the process of linking entries in its newly constructed routing table with entries in software copy 112 of hardware forwarding table 110. In step ST10, slave MSM 109 searches its newly-constructed routing table and determines whether a matching entry exists for an entry in hardware forwarding table 110. if a corresponding entry has not received via P routing protocols for the new routing table, a matching entry for the entry in hardware forwarding table 110 will not be found. If a match is not found, in step ST11, the entry is deleted from both software copy 112 of hardware forwarding table and from hardware forwarding table 110. In step ST12, slave MSM 109 determines whether all entries have been checked. If all entries have not been checked, control proceeds to step ST13 where the next entry is located and checked for age out. The process continues until all of the entries in forwarding table 110 have either been validated or deleted.

Thus, using the steps illustrated in FIG. 3, hitless failover of layer 3 forwarding can be achieved. It is not necessary to replicate IP routing protocols and protocol state information on slave MSM 109 prior to failover. As a result, processing with layer 3 routing node 100 is simplified.

Figure 4:
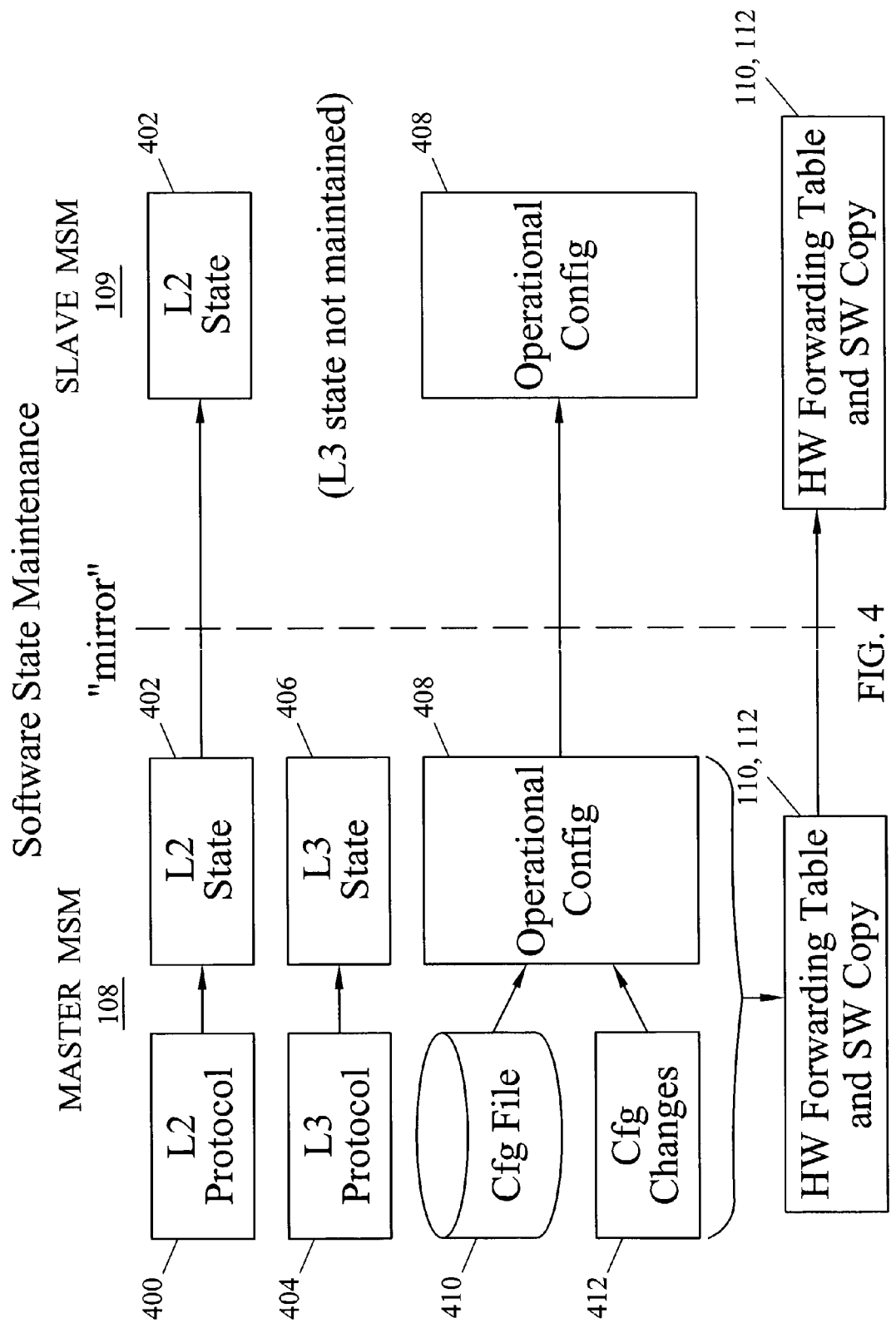
FIG. 4 is a block diagram illustrating replication of state information between master and slave management service modules according to an embodiment of the present invention.

As stated above, one advantage of the present invention is that layer 3 and higher layer protocol state information does not need to be replicated on slave MSM 109. However, layer 2 state information is preferably replicated on slave MSM 109. FIG. 4 illustrates an example of information that may be replicated from master MSM 108 to slave MSM 109 prior to failover. In FIG. 4, during operation, master MSM 108 implements layer 2 communications protocols 400, such as spanning tree protocols, which results in layer 2 state information, such as the state of spanning tree ports on forwarding device 100. Layer 2 state information 402 is preferably mirrored to slave MSM 109 so that slave MSM 109 can begin forwarding packets as if a failover had not occurred.

Master MSM 108 also executes a layer 3 protocol 404, such as one or more IP routing protocols, which creates layer 3 state information 406, such as reachability and topology information for IP destinations. This information is preferably not mirrored to slave MSM 109. Omitting the mirroring of layer 3 protocol information avoids the need for synchronizing layer 3 protocols between master and slave MSMs 108 and 109. This results in significant reductions in complexity and processing by forwarding device 100.

An operational configuration file 408, which contains information regarding the number, type, and location of modules within layer 3 forwarding device 100 is preferably stored in memory on master MSM 108. The operational configuration includes a change file 410, which stores an original configuration, and configuration changes 412 implemented since the original configuration. An example of a configuration change is the addition of a new input/output module to forwarding device 100. Operational configuration 408 is preferably mirrored to slave MSM 109 prior to failover to enable slave MSM to start operating under the same configuration previously recognized by master MSM 108. Finally, hardware forwarding table 110 and software copy 112 are preferably mirrored to slave MSM 109 to enable hitless failover. Software copy 112 is then used efficiently to link entries in the newly created routing table with entries stored in hardware.

Thus, the present invention includes improved methods and systems for hitless failover of layer 3 packet forwarding that avoid the need for mirroring layer 3 state information between master and slave management service modules. The slave MSM maintains a copy of a layer 3 forwarding table received from the master MSM. However, the slave MSM does not maintain the routing table or layer 3 state information maintained by the master management service module. Upon failover, the slave management service module is able to continue forwarding of packets for existing routes and begins construction of a new routing table. Entries in the new routing table are linked with entries in the forwarding table. Because the slave management service module is capable of continuing packet forwarding without implementing layer 3 and higher protocols, the need for maintaining synchronized upper layer protocol information is reduced.

It will be understood that various details of the invention may be changed without departing from the scope of the invention. Furthermore, the foregoing description is for the purpose of illustration only, and not for the purpose of limitation-the invention being defined by the claims.

What is claimed is:

1. A method for hitless restart of layer 3 packet forwarding in response to failure of a management service module, the method comprising:
   (a) at a master management service module:
      (i) building a first routing table by participating in layer 3 routing protocols and storing the first routing table in memory,
      (ii) building a first layer 3 forwarding table by receiving packets, performing lookups in the first routing table, and storing results from the lookups in hardware, and
      (iii) replicating the first layer 3 forwarding table to a slave management service module, and
      (iv) forwarding packets using the first routing and forwarding tables; and
   (b) at the slave management service module:
      (i) maintaining the replicated first layer 3 forwarding table received from the master management service module, and
      (ii) detecting failure of the master management service module and, in response, continuing forwarding of packets using the hardware copy of the first layer 3 forwarding table, initiating construction of a second routing table by beginning to participate in layer 3 routing protocols, and linking entries in the second routing table with the replicated first layer 3 forwarding table.

2. The method of claim 1 wherein building a first routing table includes building an IP routing table by participating in IP routing protocols.

3. The method of claim 2 wherein participating in IP routing protocols includes participating in at least one of Open Shortest Path First (OSPF), Border Gateway Protocol (BGP), Intermediate System to Intermediate System (IS-IS), Routing Information Protocol (RIP), statically configured routing, Protocol Independent Multicast (PIM) Dense Mode, PIM Sparse Mode (PIM-SM), Distance Vector Multicast Routing Protocol (DV-MRP), and Core-Based Trees (CBT).

4. The method of claim 1 wherein building a first layer 3 forwarding table includes storing destination addresses and corresponding forwarding information extracted from the first routing table in hardware.

5. The method of claim 4 wherein storing destination addresses includes storing entire destination IP addresses extracted from received packets.

6. The method of claim 4 wherein storing destination addresses includes storing IP prefixes and subnet masks extracted from the first routing table.

7. The method of claim 1 wherein forwarding packets using the first layer 3 routing and forwarding tables includes, for each received packet:
(a) performing a lookup in the first layer 3 forwarding table;
(b) in response to locating a, matching entry, forwarding the packet to its intended destination; and
(c) in response to failing to locate a matching entry, performing a lookup in the first routing table.

8. The method of claim 1 wherein detecting failure of the master management service module includes detecting the absence of heartbeat messages from the master management service module.

9. The method of claim 1 wherein detecting failure of the master management service module includes detecting a hardware or software exception of the master management service module.

10. The method of claim 1 wherein detecting failure of the master management service module includes detecting removal of the master management service module.

11. The method of claim 1 wherein linking entries in the second routing table with entries in the replicated first layer 3 forwarding table includes detecting matching entries in the second routing table that are present in the replicated first layer 3 forwarding table and deleting entries from the replicated first layer 3 forwarding table for which no matching entries in the second routing table are detected within a predetermined time period.

12. The method of claim 1 comprising replicating layer 2 and not layer 3 state information from the master management service module to the slave management service module.

13. The method of claim 1 comprising, at the slave management service module, in response to failure of the master management service module, injecting layer 2 state information into layer 2 protocol software executing on the slave management service module.

14. The method of claim 13 wherein injecting layer 2 state information into layer 2 protocol software includes sending keepalive messages to layer 2 neighbors with enhanced priority.

15. A system for hitless restart of layer 3 forwarding in response to failure of a management service module, the system comprising:
(a) a master management service module for participating in layer 3 routing protocols to build a first layer 3 routing table and storing the first layer 3 routing table in memory, for building a first layer 3 forwarding table based on received packets and lookups in the first layer 3 routing table, and for replicating the first layer 3 forwarding table to a plurality of input/output modules for forwarding packets and to a slave management service module;
(b) a plurality of input/output modules for forwarding packets using the first layer 3 routing and forwarding tables; and
(c) a slave management service module for maintaining the replicated layer 3 forwarding table received from the master management service module, detecting failure of the master management service module, and, in response, continuing forwarding of packets using the replicated first layer 3 forwarding table and initiating construction of a second layer 3 routing table by beginning to participate in layer 3 routing protocols, and for linking entries in the second layer 3 routing table with entries in the replicated first layer 3 forwarding table.

16. The system of claim 15 wherein the master management service module is adapted to build the first layer 3 forwarding table by extracting individual packet destination addresses from received packets and extracting forwarding Information from the first layer 3 routing table.

17. The system of claim 15 wherein the master management service module Is adapted to build the first layer 3 forwarding table by storing packet forwarding prefixes, subnet masks, and corresponding packet forwarding information.

18. The system of claim 15 wherein the master management service module is adapted to replicate layer 2 and not layer 3 state information to the slave management service module.

19. The system of claim 15 wherein the slave management service module is adapted to maintain the replicated first layer 3 forwarding table received from the master management service module in hardware and software.

20. The system of claim 15 wherein the slave management service module is adapted to rebuild the layer 3 routing table in software.

21. The system of claim 15 wherein the slave management service module is adapted to delete entries from the copy of the first layer 3 forwarding table that are not linked to entries in the second layer 3 routing table within, a predetermined time period.

22. The system of claim 15 wherein, in response to detecting failure of the master management service module, the slave management service module is adapted to inject layer 2 state information into its layer 2 protocol software.

23. The system of claim 22 wherein injecting layer 2 state information into the layer 2 protocol software includes, with enhanced priority, sending layer 2 keepalive messages to neighbors.

24. A computer program product comprising computer-executable instructions embodied in a computer-readable medium for performing steps comprising:
at a slave management service module:
(a) maintaining a replicated layer 3 packet forwarding table from a master management service module;
(b) detecting failure of the master management service module;
(c) in response to step (b), initiating participation in layer 3 routing protocols;
(d) building a layer 3 routing table based on step (c); and
(e) linking entries in the layer 3 routing table to entries in the replicated layer 3 forwarding table.

25. The computer program product of claim 24 wherein detecting failure of a master management service module includes detecting a hardware or software exception of the master management service module.

26. The computer program product of claim 25 wherein detecting failure of a master management service module includes detecting removal of the master management service module.

27. The computer program product of claim 24 wherein detecting failure of a master management services module includes detecting the absence of heartbeat messages from the master management service module.

28. The computer program product of claim 24 wherein initiating participation in layer 3 routing protocols includes initiating participation in at least one of Open Shortest Path First (OSPF), Border Gateway Protocol (BGP), Intermediate System to Intermediate System (IS-IS), Routing Information Protocol (RIP), statically configured routing, Protocol Independent Multicast (PIM) Dense Mode, PIM Sparse Mode (PIM-SM), Distance Vector Multicast Routing Protocol (DV-MRP), and Core-Based Trees (CBT).

29. The computer program product of claim 24 wherein building a layer 3 routing table includes building a layer 3 routing table including entries having destination address prefixes, subnet masks, and forwarding information for routing received packets.

30. The computer program product of claim 29 wherein the forwarding information for each entry includes at least one of a port identifier, a MAC address, and a VLAN identifier.

31. The computer program product of claim 24 wherein linking entries in the layer 3 routing table with entries in the replicated layer 3 forwarding table includes detecting matching entries in the layer 3 routing table and the replicated layer 3 forwarding table.

32. The computer program product of claim 31 comprising, for each entry in the replicated layer 3 forwarding table, in response to failing to detect a matching entry in the layer 3 routing table within a predetermined time period, deleting the entry from the replicated layer 3 forwarding table.

33. The computer program product of claim 24 comprising, in response to detecting failure of the master management service module, injecting layer 2 state information into layer 2 protocol software.

34. The computer program product of claim 33 wherein injecting layer 2 state information into layer 2 protocol software includes sending keepalive packets to layer 2 protocol neighbors with enhanced priority.

35. The method of claim 1 wherein the slave MSM management service module does not participate in layer 3 routing protocols prior to detecting failure of the master management service module.

36. The system of claim 15 wherein the slave management service module does not participate in layer 3 routing protocols prior to detecting failure of the master management service module.

37. The computer program product of claim 24 wherein the slave management service module does not participate in layer 3 routing protocols prior to detecting failure of the master management service module.

* * * * *